United States Patent
Komiyama

(10) Patent No.: US 9,736,424 B2
(45) Date of Patent: Aug. 15, 2017

(54) IMAGE CAPTURING APPARATUS AND CONTROL METHOD THEREFOR

(71) Applicant: CANON KABUSHIKI KAISHA, Tokyo (JP)

(72) Inventor: Tomoaki Komiyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 13/786,518

(22) Filed: Mar. 6, 2013

(65) Prior Publication Data

US 2013/0242134 A1 Sep. 19, 2013

(30) Foreign Application Priority Data

Mar. 16, 2012 (JP) ................. 2012-061145

(51) Int. Cl.
| | |
|---|---|
| *H04N 5/225* | (2006.01) |
| *H04N 5/77* | (2006.01) |
| *H04N 9/82* | (2006.01) |
| *H04N 5/232* | (2006.01) |
| *H04N 9/04* | (2006.01) |
| *G03B 17/14* | (2006.01) |
| *G03B 17/12* | (2006.01) |
| *H04N 5/445* | (2011.01) |

(52) U.S. Cl.
CPC ......... *H04N 5/772* (2013.01); *H04N 5/23209* (2013.01); *H04N 9/8205* (2013.01); *G03B 17/12* (2013.01); *G03B 17/14* (2013.01); *H04N 5/445* (2013.01)

(58) Field of Classification Search
CPC .. H04N 5/23209; H04N 5/2254; G03B 7/102; G03B 17/14; H04M 2250/20; H04M 2250/52; H04M 1/0264
USPC ............................ 348/333.02, 360
See application file for complete search history.

(56) References Cited

U.S. PATENT DOCUMENTS

| | | | | |
|---|---|---|---|---|
| 8,248,509 B2* | 8/2012 | Shirai | ............ | 348/335 |
| 8,345,123 B2* | 1/2013 | Sugimori | .......... | 348/231.1 |
| 8,422,876 B2* | 4/2013 | Isaka | ............ | G02B 7/08 |
| | | | | 396/133 |
| 8,477,214 B2* | 7/2013 | Yoshida | ............ | 348/231.3 |
| 8,488,050 B2* | 7/2013 | Ueda | ............ | G03B 13/36 |
| | | | | 348/333.04 |
| 8,502,883 B2* | 8/2013 | Nonaka | ............ | G03B 13/10 |
| | | | | 348/224.1 |
| 8,704,907 B2* | 4/2014 | Shibuno et al. | ........... | 348/222.1 |

(Continued)

FOREIGN PATENT DOCUMENTS

JP 2002-010114 A 1/2002

*Primary Examiner* — Ngoc-Yen Vu
(74) *Attorney, Agent, or Firm* — Carter, DeLuca, Farrell & Schmidt, LLP

(57) ABSTRACT

An image capturing apparatus comprises an image capturing unit configured to capture an object and acquire image data; a first acquisition unit configured to acquire image capturing conditions of the image capturing apparatus; a holding unit configured to hold history information of peripheral devices that have been connected to the image capturing apparatus; and a second acquisition unit configured to acquire image capturing auxiliary information related to image capturing performed by the image capturing unit based on the image capturing conditions acquired by the first acquisition unit and on the history information held in the holding unit.

17 Claims, 13 Drawing Sheets

(56) References Cited

U.S. PATENT DOCUMENTS

| | | | |
|---|---|---|---|
| 8,724,012 B2* | 5/2014 | Ueda et al. | 348/346 |
| 8,745,609 B2* | 6/2014 | Oka | 717/168 |
| 8,773,554 B2* | 7/2014 | Yoshida | H04N 1/32128 348/231.3 |
| 8,854,530 B2* | 10/2014 | Nakamoto | H04N 5/23212 348/333.01 |
| 2005/0128342 A1* | 6/2005 | Izukawa | 348/360 |
| 2005/0140816 A1* | 6/2005 | Tschida et al. | 348/360 |
| 2006/0204044 A1* | 9/2006 | Takemoto | G06T 11/60 382/107 |
| 2012/0013787 A1* | 1/2012 | Chiang | 348/360 |
| 2012/0327257 A1* | 12/2012 | O'Keefe et al. | 348/222.1 |
| 2012/0327284 A1* | 12/2012 | Sugimori | 348/333.01 |
| 2013/0088636 A1* | 4/2013 | Inoue | 348/346 |
| 2014/0293004 A1* | 10/2014 | Tsubaki | H04N 5/23258 348/43 |
| 2015/0077603 A1* | 3/2015 | Matsuzawa | H04N 5/77 348/297 |

* cited by examiner

FIG. 4

| | MAIN BODY ID | LENS ID | GPS INFORMATION | DIRECTION INFORMATION | DATE/TIME INFORMATION | FLASH/NO-FLASH INFORMATION | IMAGE CAPTURING AUXILIARY INFORMATION |
|---|---|---|---|---|---|---|---|
| | 401 | 402 | 403 | 404 | 405 | 406 | 407 |
| SCENE 1 | 001 | 002 | N:aa.aaa E:bb.bbb | S | yyyy/mm/dd | NO FLASH | Pattern A |
| SCENE 2 | 003 | 007 | N:cc.ddd E:ee.eee | W | yyyy/mm/dd | FLASH | Pattern B |
| SCENE 3 | 002 | 001 | N:ff.fff E:gg.ggg | E | yyyy/mm/dd | NO FLASH | Pattern C |
| ... | ... | ... | ... | ... | ... | ... | ... |

400

IMAGE CAPTURING APPARATUS AND CONTROL METHOD THEREFOR

BACKGROUND OF THE INVENTION

Field of the Invention

The present invention relates to image capturing technique for acquiring composition information from outside via a network.

Description of the Related Art

Image capturing apparatuses such as digital cameras capture images based on composition information (image capturing parameters) held in a built-in memory in advance and on composition information manually set by a user. The mainstream practice is that the image capturing parameters specifically designed for scenes such as portrait image capturing, macro image capturing and night view image capturing are held in the apparatuses, and images are captured using such information. Examples of the image capturing parameters include a value of a diaphragm of a lens, a shutter speed, and an ISO film speed.

Incidentally, rapid dissemination of network communication technology has contributed to advancement in always-connected apparatuses and cloud-based apparatuses in recent years. There has been a proposal to capture images after acquiring information such as image capturing parameters from a server and the like via a network (see, for example, Japanese Patent Laid-Open No. 2002-010114).

According to Japanese Patent Laid-Open No. 2002-010114 mentioned above, a server can adopt the optimal composition by taking into account, for example, information of an accessory that is currently attached. However, when the user owns a plurality of accessories such as lenses, there may be cases where the user is carrying the plurality of accessories with him/her but not all of them are currently attached. In such cases, there is a possibility that the user may miss the opportunity to capture a scene that could have been captured only by changing a lens.

SUMMARY OF THE INVENTION

The present invention has been made in consideration of the aforementioned problems, and realizes an image capturing technology that can increase the number of types of composition information provided by an information providing apparatus.

In order to solve the aforementioned problems, the present invention provides an image capturing apparatus comprising: an image capturing unit configured to capture an object and acquire image data; a first acquisition unit configured to acquire image capturing conditions of the image capturing apparatus; a holding unit configured to hold history information of peripheral devices that have been connected to the image capturing apparatus; and a second acquisition unit configured to acquire image capturing auxiliary information related to image capturing performed by the image capturing unit based on the image capturing conditions acquired by the first acquisition unit and on the history information held in the holding unit.

In order to solve the aforementioned problems, the present invention provides a control method of an image capturing apparatus having an image capturing unit that captures an object and acquires image data, the method comprising: acquiring image capturing conditions of the image capturing apparatus; holding history information of peripheral devices that have been connected to the image capturing apparatus; and acquiring image capturing auxiliary information related to image capturing performed by the image capturing unit based on the acquired image capturing conditions and on the held history information.

According to the present invention, the number of types of composition information provided by an information providing apparatus can be increased. Therefore, images can be captured with a composition that makes efficient use of accessories.

Further features of the present invention will become apparent from the following description of exemplary embodiments (with reference to the attached drawings).

BRIEF DESCRIPTION OF THE DRAWINGS

FIG. 4 shows the structure of a database held in the information providing apparatus according to the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes an embodiment in which the present invention is applied to, for example, an image capturing apparatus such as a digital camera that captures still images.

<Configuration of Apparatus>

Figure 1A:
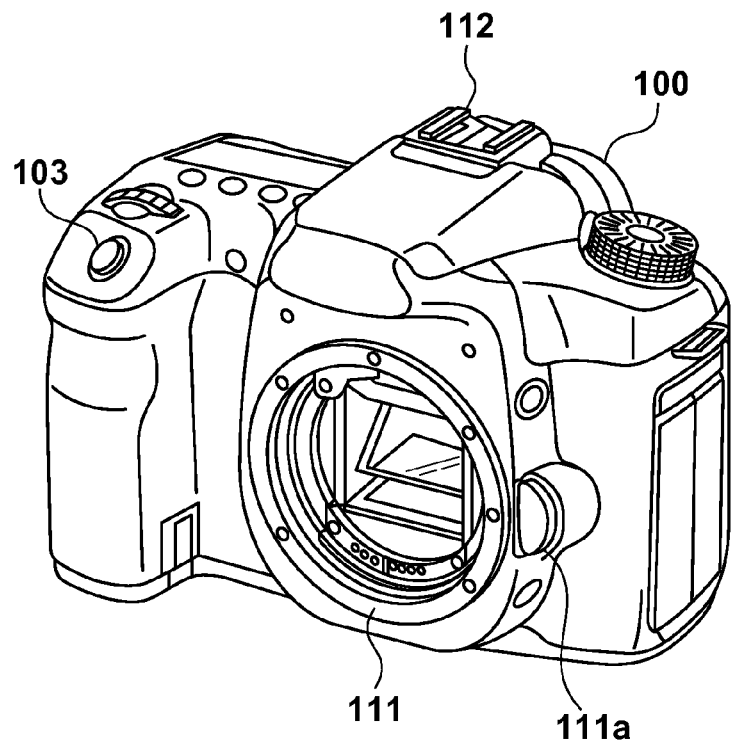
FIG. 1A is an external view of the front of an image capturing apparatus according to an embodiment of the present invention.
Figure 1B:
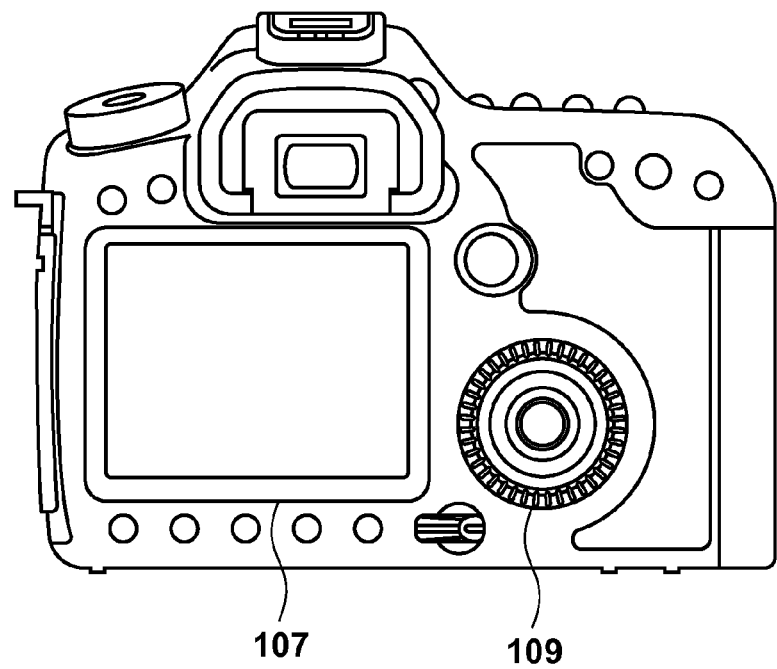
FIG. 1B is an external view of the back of an image capturing apparatus according to an embodiment of the present invention.

First, a description is given of the external view of an image capturing apparatus according to an embodiment of the present invention with reference to FIGS. 1A and 1B.

As shown in FIGS. 1A and 1B, an image capturing apparatus 100 includes a release button 103, a display unit 107, an operation unit 109, a lens mount 111, and a flash detection unit 112. The release button 103 is an operation unit that outputs signals serving as a trigger for instructing the start or end of image capturing and a trigger for acquiring image capturing auxiliary information. There are two states of the release button 103: a first pressed state S1 and a second pressed state S2. Note that a transition to the second pressed state S2 always passes through the first pressed state S1.

The lens mount 111 is a member for connecting a lens unit 200, which serves as an accessory as will be described later with reference to FIGS. 2A to 2C, to the image capturing apparatus 100 in such a manner that the lens unit 200 can communicate with the image capturing apparatus 100. With this lens mount 111, the image capturing apparatus 100 exchanges unique information with the lens unit 200. The unique information indicates, for example, whether or not the lens unit 200 is attached and model information of the lens that is currently attached. A lens unlock button 111a is provided in the vicinity of the lens mount 111. By pressing this lens unlock button 111a, the lens unit 200 can be detached from the main body of the apparatus. In this way, the lens unit 200 can be changed.

The flash detection unit 112 detects whether or not a flash is attached. The flash can be selectively attached to the apparatus as an accessory. As with the lens mount 111, the image capturing apparatus 100 exchanges information indicating whether or not the flash is attached and unique information of the flash.

Figure 2A:
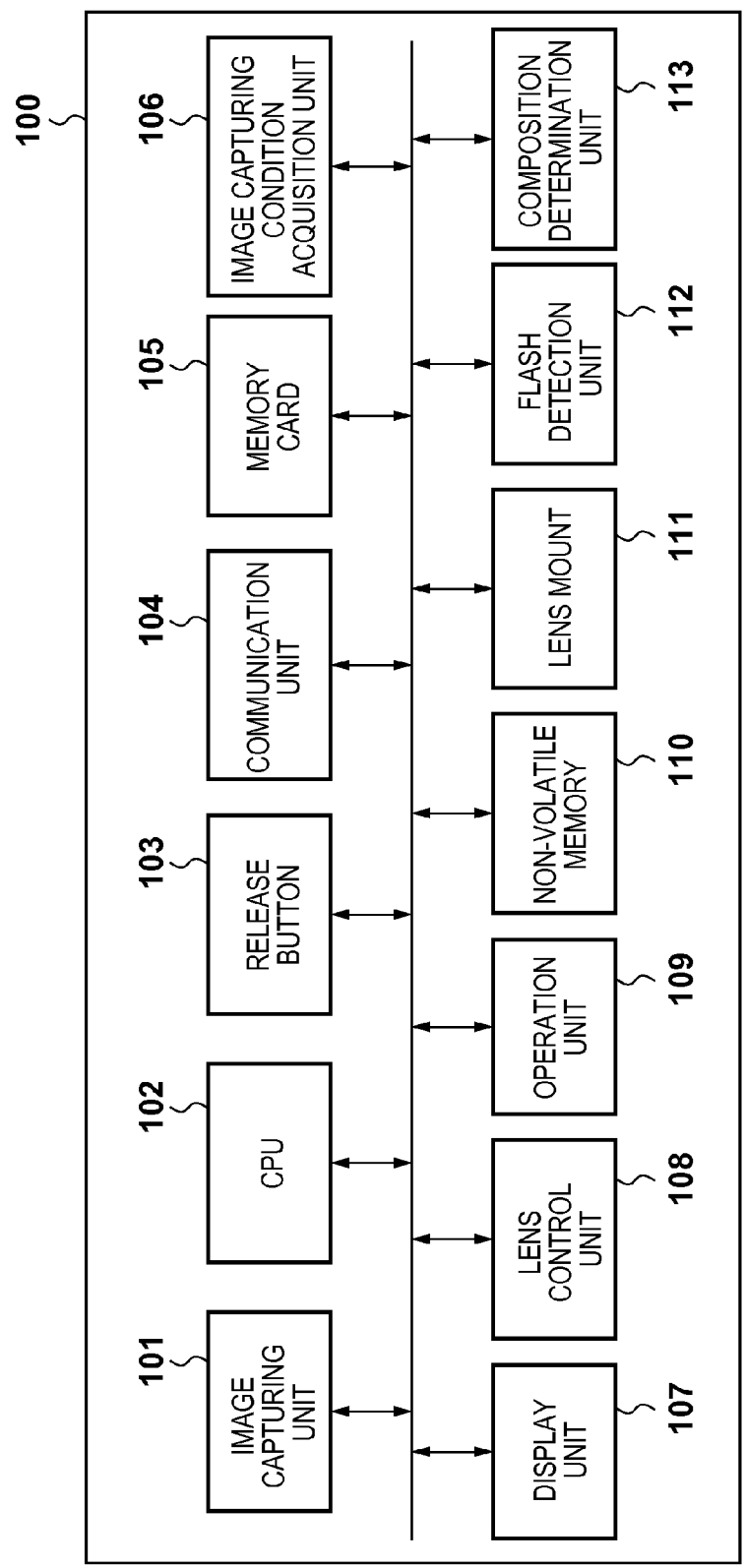
FIG. 2A is a block diagram showing the configuration of an image capturing apparatus according to the present embodiment.
Figure 2B:
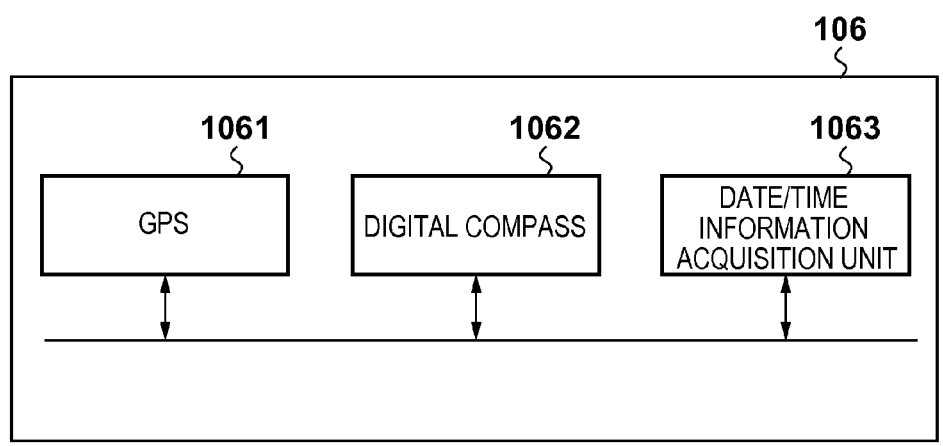
FIG. 2B is a block diagram showing the configuration of an image capturing condition acquisition unit of the image capturing apparatus according to the present embodiment.
Figure 2C:
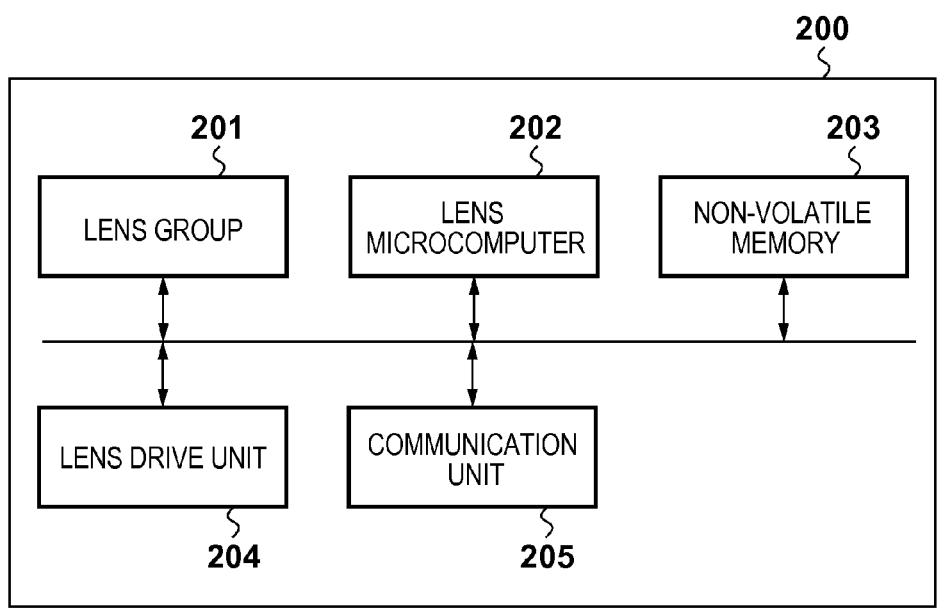
FIG. 2C is a block diagram showing the configuration of a lens unit of the image capturing apparatus according to the present embodiment.

A description is now given of configurations of the image capturing apparatus 100 and the lens unit 200 according to the present embodiment with reference to FIGS. 2A to 2C.

First, the configuration of the image capturing apparatus 100 is explained.

Referring to FIG. 2A, the lens unit 200, which will be described later, is attachable to and detachable from the image capturing apparatus 100.

An image capturing unit 101 converts an analog image signal into a digital signal and generates digital image data to which signal processing such as JPEG encoding and MPEG encoding has been applied. Note that the analog image signal is generated by converting an image of an object focused by the lens unit 200 into an electrical signal using a photoelectric conversion element. The digital image data generated by the image capturing unit 101 is recorded in a memory card 105.

A CPU 102 deploys program codes stored in a non-volatile memory 110 to a volatile memory such as a RAM and executes the deployed program codes. The CPU 102 also executes processing corresponding to operational input from the release button 103 and the operation unit 109 and to various types of information received from a communication unit 104.

The release button 103 outputs signals serving as an image capturing trigger for instructing the start or end of image capturing and a trigger for starting acquisition of image capturing auxiliary information from an information providing apparatus 300, which will be described later with reference to FIG. 3.

The communication unit 104 communicates with the information providing apparatus 300 that holds a database 400, which will be described later with reference to FIG. 4, for requesting the information providing apparatus 300 to transmit the image capturing auxiliary information, and conversely for transmitting model information, lens information, image capturing conditions, and the like from the image capturing apparatus 100 to the information providing apparatus 300. It suffices for the communication unit 104 to exchange information with the information providing apparatus 300 using communication protocols such as TCP/IP. The Internet, LAN, WAN, and other networks may be used.

The memory card 105 is a flash memory or a USB memory that is attachable to and detachable from a slot of the image capturing apparatus 100, and is used when writing and reading image data.

As shown in FIG. 2B, an image capturing condition acquisition unit 106 includes a GPS 1061 for acquiring a current position, a digital compass 1062 for acquiring the direction of the apparatus, and a date/time information acquisition unit 1063 for acquiring captured date and time. Note that the current position, the direction of the apparatus, and the captured date and time serve as image capturing conditions. The GPS 1061 acquires information such as the latitude, longitude, altitude, etc. of the current position by way of positioning through reception of radio waves from a plurality of GPS satellites via a GPS antenna. The digital compass 1062 acquires direction information related to the direction of the apparatus at the time of capturing the object. The date/time information acquisition unit 1063 acquires date/time information related to the season and time zone from a built-in clock that runs on a battery. Note that the communication unit 104 may acquire information related to image capturing conditions, such as the aforementioned current position information, direction information and date/time information, from an external NTP server via the Internet.

The display unit 107 displays a menu related to settings of the image capturing apparatus 100 and images captured by the image capturing unit 101 (live-view). The display unit 107 also displays image capturing auxiliary information in such a manner that the displayed image capturing auxiliary information is superimposed over them (see FIG. 7). A lens control unit 108 controls driving of a lens group 201 by outputting a control signal to the lens unit 200 via the lens mount 111. The lens unit 200 and the lens group 201 will be described later. The lens control unit 108 also acquires unique information related to a lens from the lens unit 200 attached to the main body of the apparatus via the lens mount 111.

The operation unit 109 accepts, for example, an operation on a menu related to user settings of the image capturing apparatus 100, an operation for selecting and viewing image data stored in the memory card 105, and an operation for designating one of a plurality of pieces of image capturing auxiliary information acquired from the information providing apparatus 300.

Information that should be held during a deactivated period until the next activation, such as settings of the main body of the apparatus, is stored in the non-volatile memory 110. In the present embodiment, the non-volatile memory 110 is also used to hold model information of the main body of the apparatus, the aforementioned image capturing conditions, and unique information acquired from the lens unit 200 attached to the main body of the apparatus.

The lens mount 111 serves as an interface for exchanging unique information of the lens unit 200 attached to the main body of the apparatus.

The flash detection unit 112 detects attachment of a flash to the main body of the apparatus.

A composition determination unit 113 determines whether image capturing auxiliary information acquired from the information providing apparatus 300 is suited for the lens that is currently attached.

A description is now given of the configuration of the lens unit 200.

As shown in FIG. 2C, the lens unit 200, which is attachable to and detachable from the image capturing apparatus 100, mainly includes the lens group 201, a lens microcomputer 202, a non-volatile memory 203, a lens drive unit 204, and a communication unit 205.

The lens group 201 is constituted by a plurality of lenses such as a zoom lens and a focus lens.

The lens microcomputer 202 executes optical correction processing such as zoom and focus in accordance with a control signal from the lens control unit 108 of the image capturing apparatus 100, and outputs a control instruction corresponding to the result of the processing to the lens drive unit 204.

Unique information related to the lens unit 200 is stored in the non-volatile memory 203.

The lens drive unit 204 drives the lens group 201 in accordance with a control instruction from the lens microcomputer 202.

The communication unit 205 receives a control signal from the image capturing apparatus 100 and transmits unique information and control information of the lens unit 200 to the image capturing apparatus 100.

<Configuration of Information Providing Apparatus>

Figure 3:
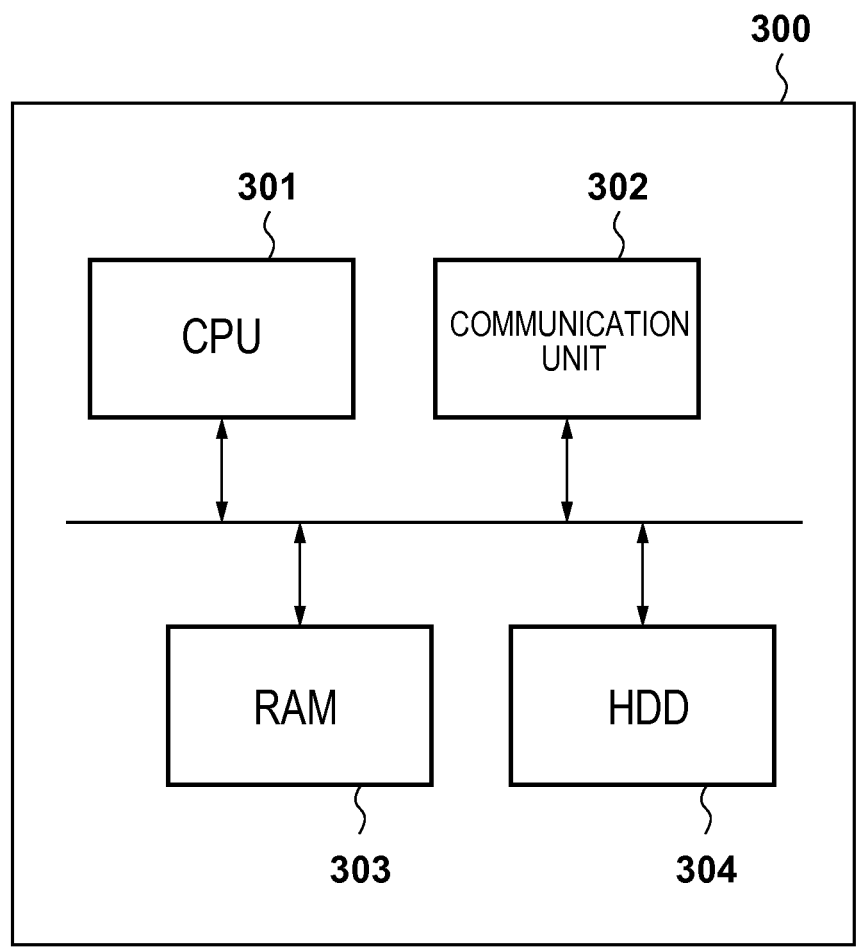
FIG. 3 is a block diagram showing the configuration of an information providing apparatus according to the present embodiment.

The following describes the configuration of the information providing apparatus 300 that holds a database with reference to FIG. 3.

Referring to FIG. 3, a CPU 301 controls communication performed by the information providing apparatus 300 in accordance with a control program and input data. A communication unit 302 communicates with a client apparatus such as the image capturing apparatus 100. A RAM 303, a volatile memory, is used as a temporary storage area for data and a work area for programs. A hard disk drive (HDD) 304 is an auxiliary storage device for storing various types of data and programs. Note that in the present embodiment, a database 400, which will be described later with reference to FIG. 4, is also structured in the HDD 304.

One example of the information providing apparatus 300 is a web server operating through cloud computing. However, the information providing apparatus 300 is not limited to the configuration shown in FIG. 3. For example, a control unit and storage may be distributed to a plurality of servers via a network.

<Structure of Database>

The following describes the structure of the database 400 held in the information providing apparatus 300 with reference to FIG. 4.

As shown in FIG. 4, the database 400 manages information in units of scenes. Each scene is associated with a plurality of pieces of information (a main body ID, a lens ID, GPS (current position) information, direction information, date/time information, flash/no-flash information, and image capturing auxiliary information).

The main body ID 401 indicates the model of an image capturing apparatus suited for capturing the corresponding scene. The lens ID 402 indicates the type of a lens suited for capturing the corresponding scene. The GPS information 403 indicates the location suited for capturing the corresponding scene. In the present embodiment, the GPS information 403 is expressed in latitude and longitude. The direction information 404 indicates the direction suited for capturing the corresponding scene. The date/time information 405 indicates the date and time suited for capturing the corresponding scene. In particular, the date/time information 405 is useful in specifying the season and time zone. The flash/no-flash information 406 indicates whether or not the use of a flash is suited for capturing the corresponding scene. The image capturing auxiliary information 407 indicates a composition for optimally capturing the corresponding scene.

The image capturing auxiliary information 407 may be image data captured with the optimal composition, information for controlling display of gridlines on the camera, and the like. Alternatively, the image capturing auxiliary information 407 may be information presented to the user to suggest the optimal settings. Although the main body ID 401 and the lens ID 402 have been described as separate items, a pair of the main body ID 401 and the lens ID 402 may be managed as one item.

<Processing for Acquiring Image Capturing Auxiliary Information>

Figure 5:
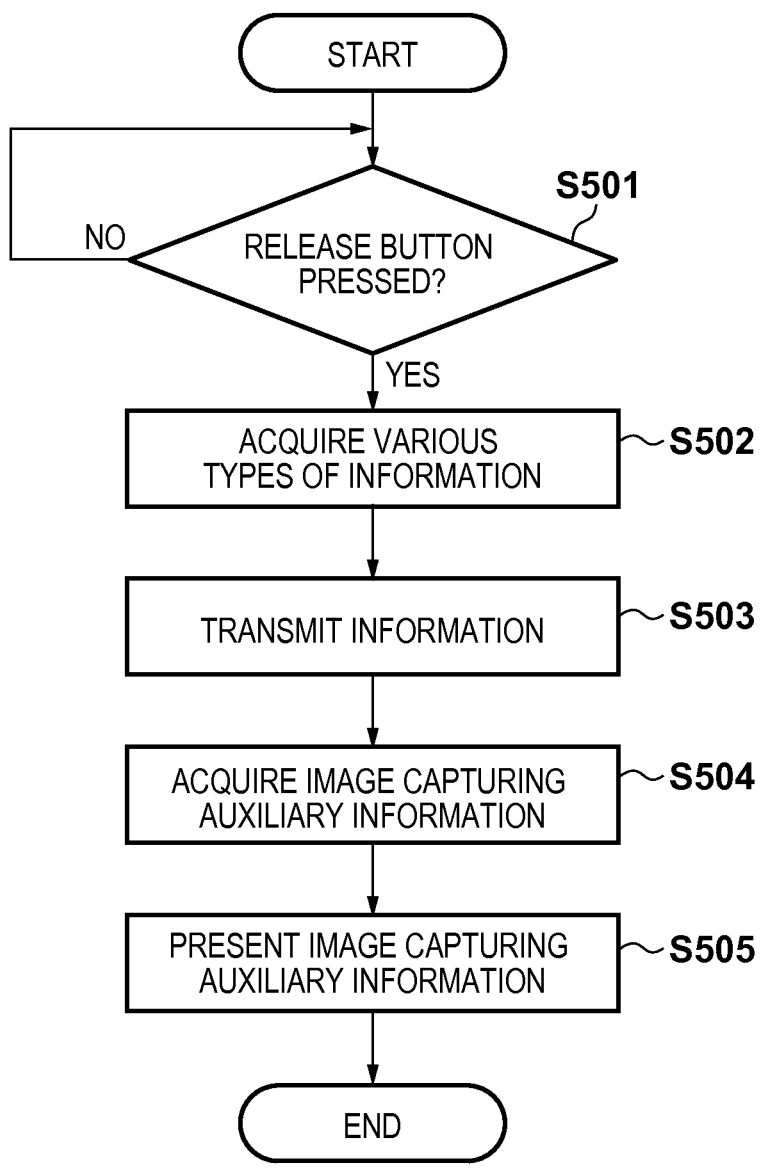
FIG. 5 is a flowchart of processing for acquiring auxiliary information in a first embodiment.

A description is now given of processing for acquiring the image capturing auxiliary information in the present embodiment with reference to FIG. 5. Note that this processing is realized by the CPU 102 deploying a program stored in the non-volatile memory 110 to the RAM and executing the deployed program.

When the image capturing apparatus 100 has entered an image capturing mode in response to a user operation and the like, the processing shown in FIG. 5 is started.

Referring to FIG. 5, in S501, the CPU 102 determines whether or not the release button 103 is in the first pressed state S1. When the CPU 102 determines that the release button 103 is in the first pressed state S1, the CPU 102 starts communication with the information providing apparatus 300 via the communication unit 104.

In S502, the CPU 102 acquires model information of the main body of the apparatus, image capturing conditions, and lens unique information from the non-volatile memory 110. The lens unique information is transmitted from the communication unit 205 to the image capturing apparatus 100 via the lens mount 111 when the lens unit 200 is attached to the main body of the apparatus. Also, in S502, the CPU 102 acquires GPS information, direction information and date/time information at the time of the first pressed state S1 from the image capturing condition acquisition unit 106. Information indicating whether or not the flash is attached is acquired from the flash detection unit 112. In the present embodiment, it is assumed that positioning is performed in advance on a periodic basis using the GPS 1061, and that the latest position information is held in the image capturing condition acquisition unit 106. Therefore, in S502, the CPU 102 acquires the current latest position information during the first pressed state S1.

In S503, the CPU 102 transmits various types of information acquired in S502 to the information providing apparatus 300 via the communication unit 104.

Figure 6:
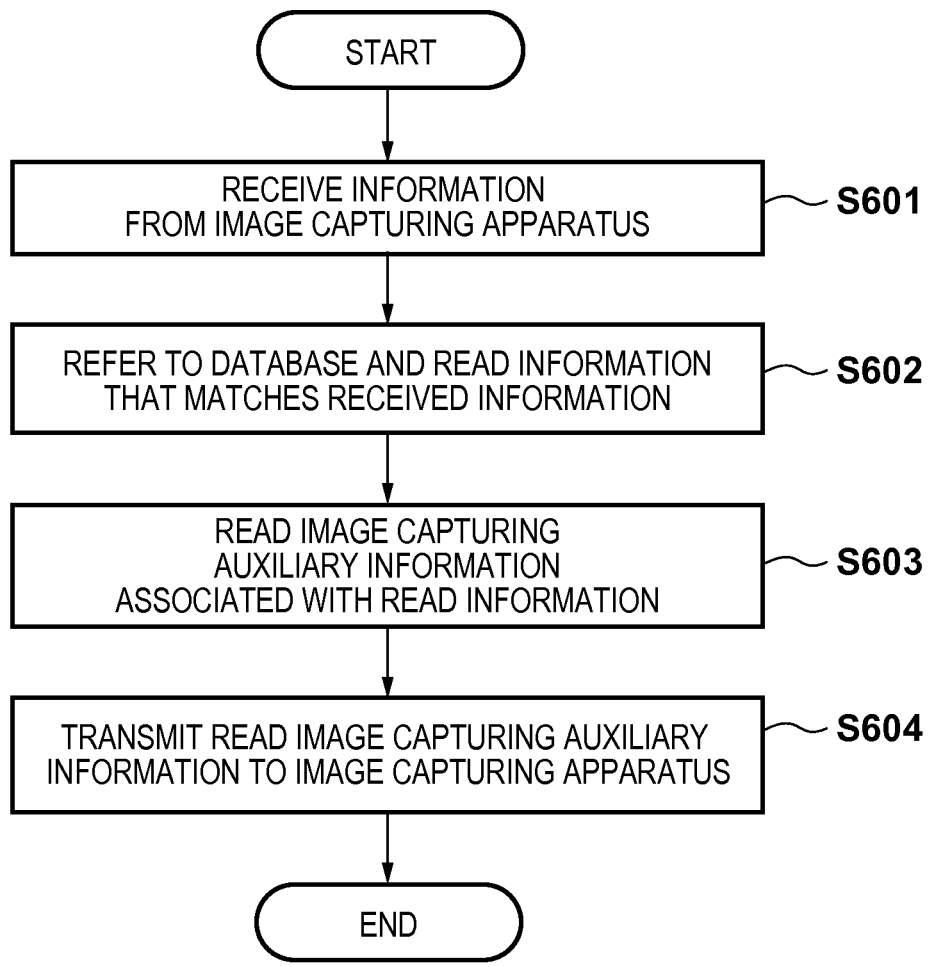
FIG. 6 is a flowchart of the operation of the information providing apparatus according to the present embodiment.

The following describes the operation performed by the information providing apparatus 300 upon receiving various types of information from the image capturing apparatus 100 with reference to FIG. 6. Note that this processing is realized by the CPU 301 of the information providing apparatus 300 deploying a program stored in the HDD 304 to the RAM 303 and executing the deployed program.

Referring to FIG. 6, in S601, the CPU 301 receives the model information, information related to the image capturing conditions, the lens unique information, and the like from the image capturing apparatus 100.

In S602, the CPU 301 refers to the database 400 shown in FIG. 4 and searches for a scene that corresponds to the various types of information received in S601. Note that in the present embodiment, the image capturing auxiliary information is not transmitted from the image capturing apparatus 100, and therefore items excluding the image capturing auxiliary information are checked during the search. Note that a criterion for determining that a scene corresponds to the various types of information is not necessarily limited to the case where information associated with the scene is identical to the various types of information. The criterion may be set so that a scene is determined to correspond to the various types of information when the image capturing conditions are within a certain tolerance and when the apparatuses share similar functions. Furthermore, items that correspond to the various types of information are not necessarily limited to the aforementioned items. Alternatively, only a part of the aforementioned items may be used, or other items may be set.

The following description is given under the assumption that the CPU 301 determines that the various types of information received from the image capturing apparatus 100 correspond to scene 1.

In S603, the CPU 301 reads, from the HDD 304, image capturing auxiliary information (in the present case, Pattern A) associated with the corresponding scene (in the present case, scene 1) that has been found as a result of the search in S602.

Thereafter, in S604, the CPU 301 transmits the image capturing auxiliary information read in S603 to the image capturing apparatus 100. The CPU 301 then ends the processing.

Returning to the description of FIG. 5, in S504, the CPU 102 receives the image capturing auxiliary information transmitted from the information providing apparatus 300.

In S505, the CPU 102 displays the image capturing auxiliary information received in S504 on the display unit 107.

Figure 7:
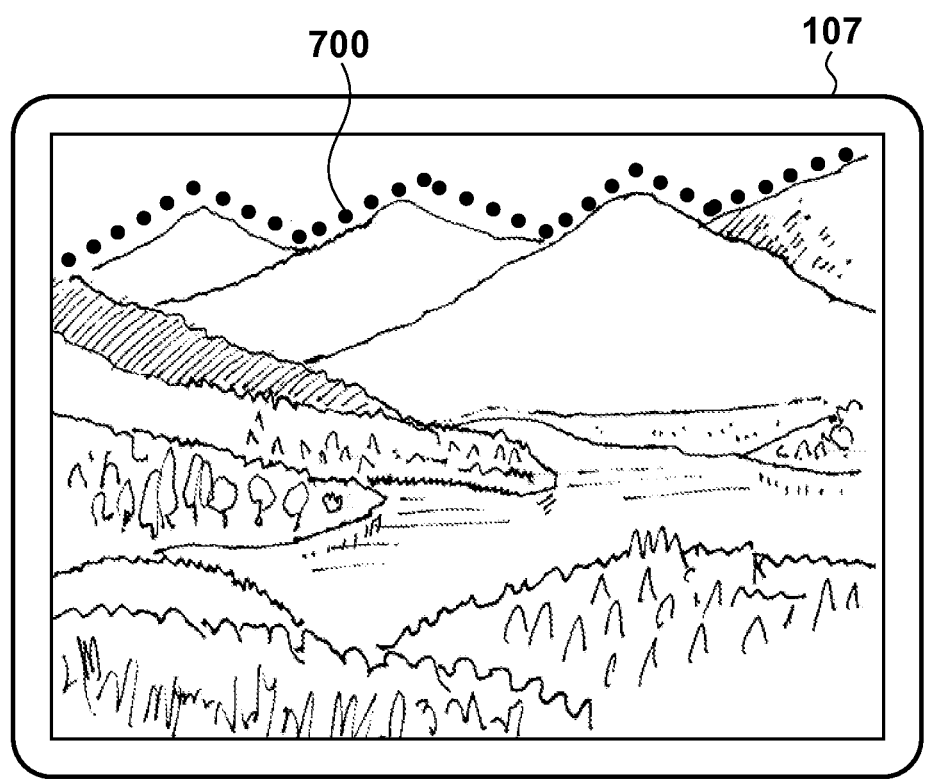
FIG. 7 shows an example of presentation of the auxiliary information in the first embodiment.

FIG. 7 shows an example of a screen on which the image capturing auxiliary information is presented. In FIG. 7, a dotted line for matching the ridges of the mountains, which are the objects, with the optimal positions is displayed as the image capturing auxiliary information 700. In this way, the user can capture an image with an appropriate composition based on the image capturing auxiliary information 700.

According to the present embodiment, model information of the image capturing apparatus 100, image capturing conditions, unique information of the lens that is currently attached, and the like are transmitted to the information providing apparatus 300, and the image capturing auxiliary information is acquired in response. In this way, an image can be captured with the optimal composition for the configuration of the image capturing apparatus including the lens used by the user.

Second Embodiment

A description is now given of processing for acquiring image capturing auxiliary information in a second embodiment with reference to FIGS. 8 to 10B.

In the first embodiment described with reference to FIG. 5, image capturing auxiliary information is acquired based on model information of the image capturing apparatus, image capturing conditions, unique information of the lens that is currently attached, and the like. On the other hand, in the present embodiment, image capturing auxiliary information is acquired based on unique information of the lenses that have been attached in the past in addition to the lens that is currently attached.

Note that the present embodiment will be described under the precondition that the image capturing apparatus 100 and the information providing apparatus 300 are configured in a manner similar to the first embodiment, and that a plurality of lens units have already been attached in the past. When a lens unit is attached, lens information that is stored in the non-volatile memory 203 thereof is recorded as history information in the non-volatile memory 110 of the image capturing apparatus 100 via the communication unit 205. It is assumed here that three types of lens units, that is to say, lenses A, B and C have been attached to the image capturing apparatus 100 in the past, and that history information of these three types of lenses is recorded in the non-volatile memory 110 of the image capturing apparatus 100.

Figure 8:
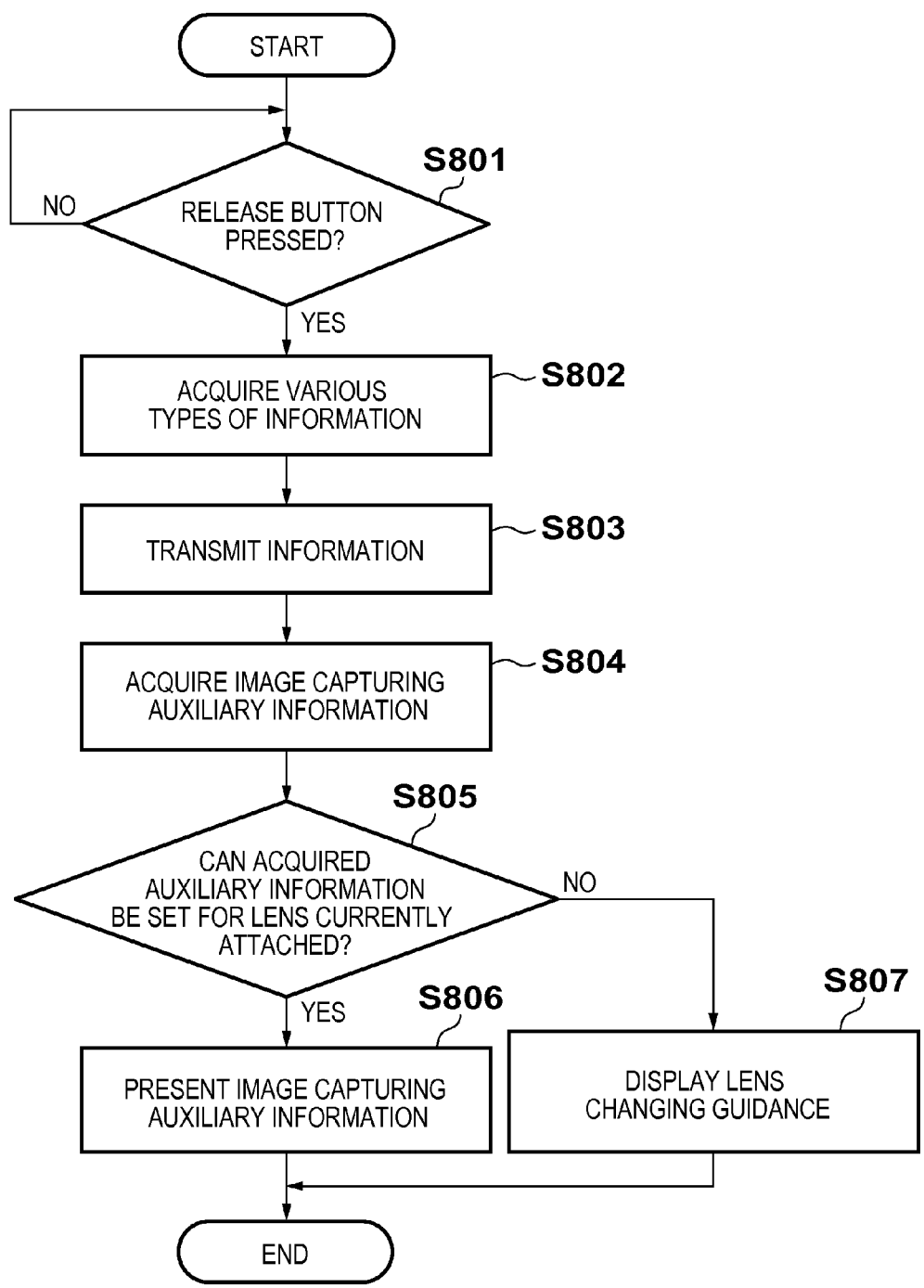
FIG. 8 is a flowchart of processing for acquiring auxiliary information in a second embodiment.

FIG. 8 shows processing for acquiring image capturing auxiliary information in the second embodiment.

The processes of S801 to S804 in FIG. 8 are substantially the same as the processes of S501 to S504 in FIG. 5. It should be noted that the aforementioned history information of the lenses that have been attached is added to the information transmitted to the information providing apparatus 300. As the information that the information providing apparatus 300 receives from the image capturing apparatus 100 includes the history information of the lenses, the information providing apparatus 300 selects one of the pieces of image capturing auxiliary information associated with the lenses in the database 400. At this time, for example, image capturing auxiliary information associated with a scene that is closest in values to the received information may be selected. Alternatively, for example, the number of times each lens was attached or the frequency of the use of each lens may also be transmitted to the information providing apparatus, and image capturing auxiliary information associated with a lens that was attached the largest number of times or a lens that was most frequently used may be preferentially selected.

In S805, through the composition determination unit 113, the CPU 102 determines whether image capturing parameters can be set for the lens that is currently attached based on the image capturing auxiliary information received from the information providing apparatus 300. For example, this determination is made in the image capturing apparatus 100 based on the image capturing auxiliary information to which information of lenses for which the image capturing parameters can be set has been added as metadata. When the CPU 102 determines that the image capturing parameters can be set in S805, the CPU 102 displays the image capturing auxiliary information on the display unit 107 in S806 so as to present it to the user.

When the CPU 102 determines that the image capturing parameters cannot be set in S805, the CPU 102 displays a lens changing guidance on the display unit 107 in S807 so as to suggest the user to change the lens.

Figure 9A:
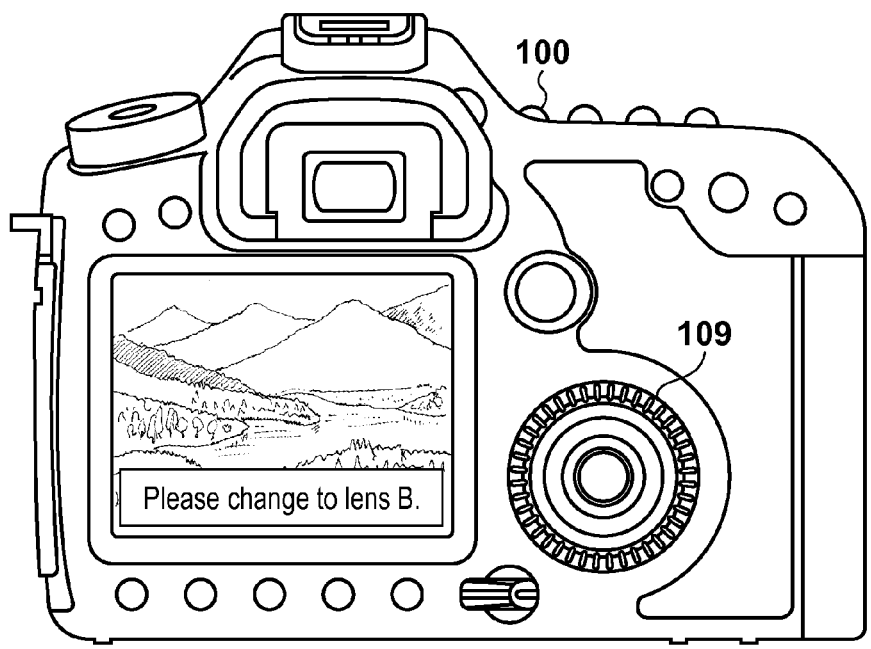
FIG. 9A shows a lens changing guidance screen according to the second embodiment.

FIG. 9A shows an example of display of the lens changing guidance in S807. It is assumed here that the image capturing auxiliary information with which the image capturing parameters can be set for a wide-angle lens has been acquired from the information providing apparatus 300.

FIG. 9A shows suggestion of a change to a wide-angle lens (in the present case, lens B) that has been attached in the past.

Figure 9B:
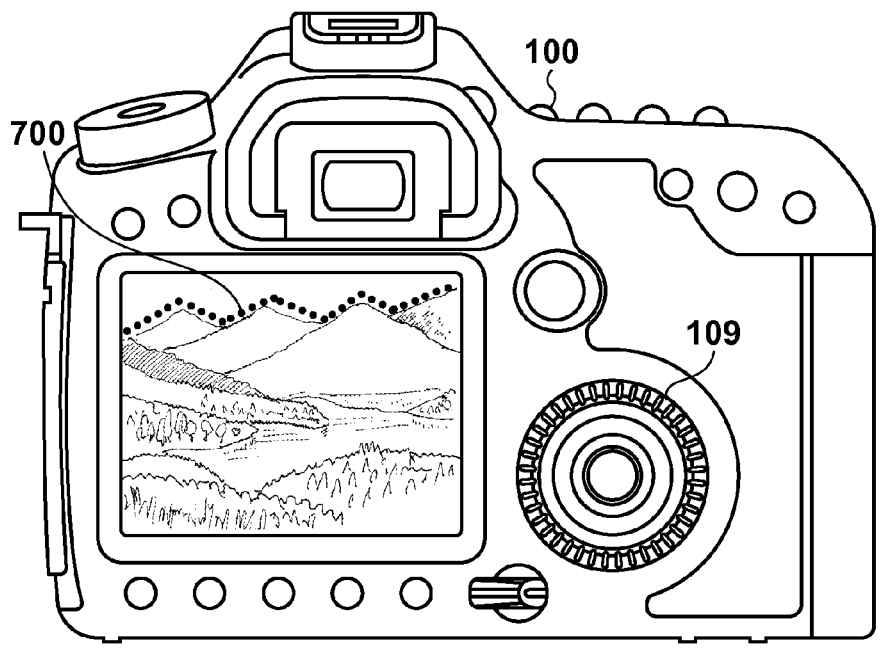
FIG. 9B shows an example of presentation of auxiliary information after the lens changing guidance in the second embodiment.
Figure 10A:
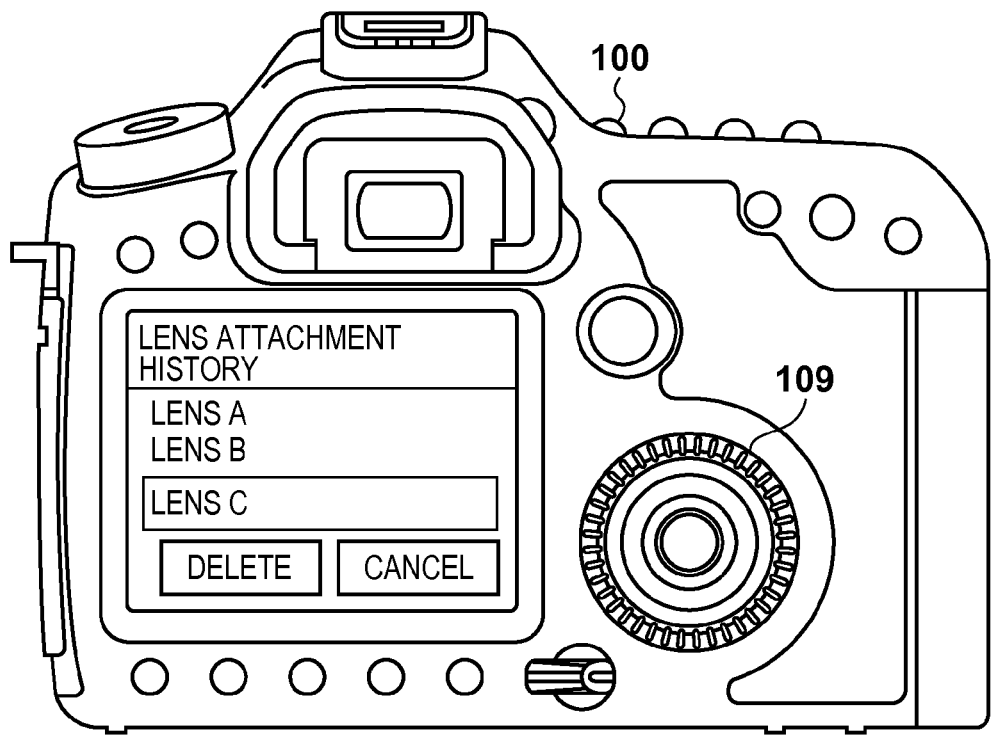
FIGS. 10A and 10B show screens for deleting history information in the second embodiment.
Figure 10B:
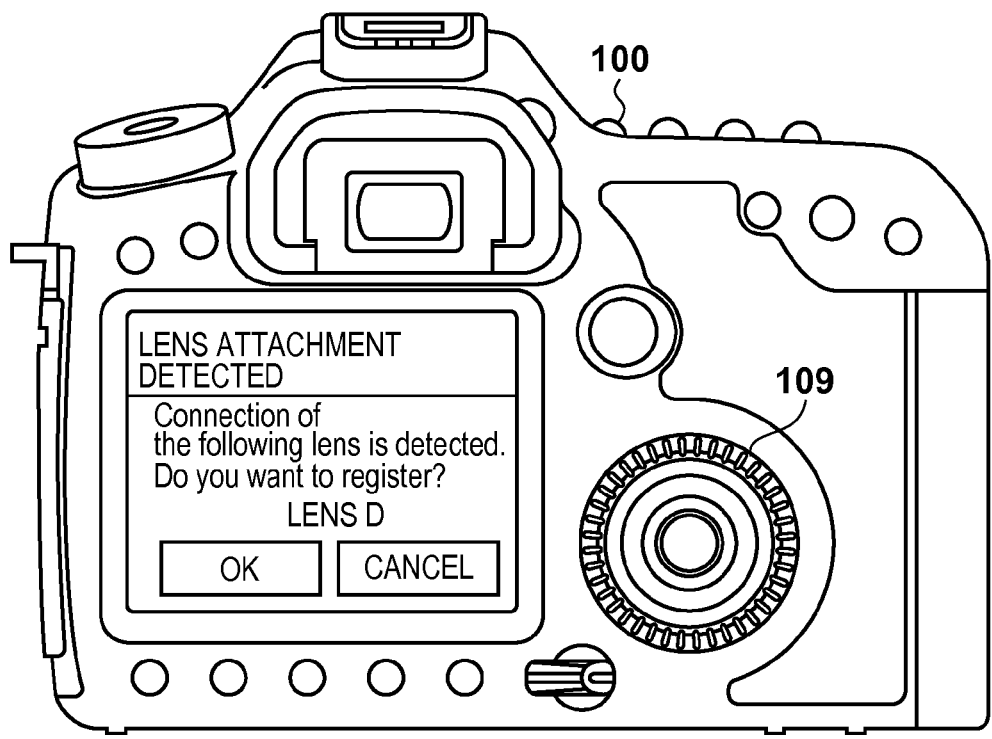

FIG. 9B shows an example of display performed after the lens is changed. Once the user has changed the lens in response to the message, the image capturing auxiliary information 700 that can be set for the post-change lens is presented. Note that if information is transmitted to the information providing apparatus each time the image capturing auxiliary information is acquired for every lens that has been attached in the past, there will be a possibility that lens information that is not desired by the user may be transmitted. In view of this, as shown in FIG. 10A, a lens may be deleted from the history information. After the deletion, the deleted information will not be included in the information transmitted to the information providing apparatus. Furthermore, when detecting attachment of lens D that has never been attached in the past, an inquiry may be made as to whether or not the lens D should be stored as history information so as to have the user make that determination, as shown in FIG. 10B. Whether or not a lens has been attached in the past is determined as follows. Each time a lens is attached, lens information recorded in the non-volatile memory 110 is checked. If corresponding attachment history information does not exist, the presentation shown in FIG. 10B is performed.

According to the present embodiment, attachment history information of each lens is held, and image capturing auxiliary information corresponding thereto is acquired. In this way, only the image capturing auxiliary information with which image capturing parameters can be set for a lens that has been attached in the past can be acquired from the information providing apparatus.

Third Embodiment

Figure 11:
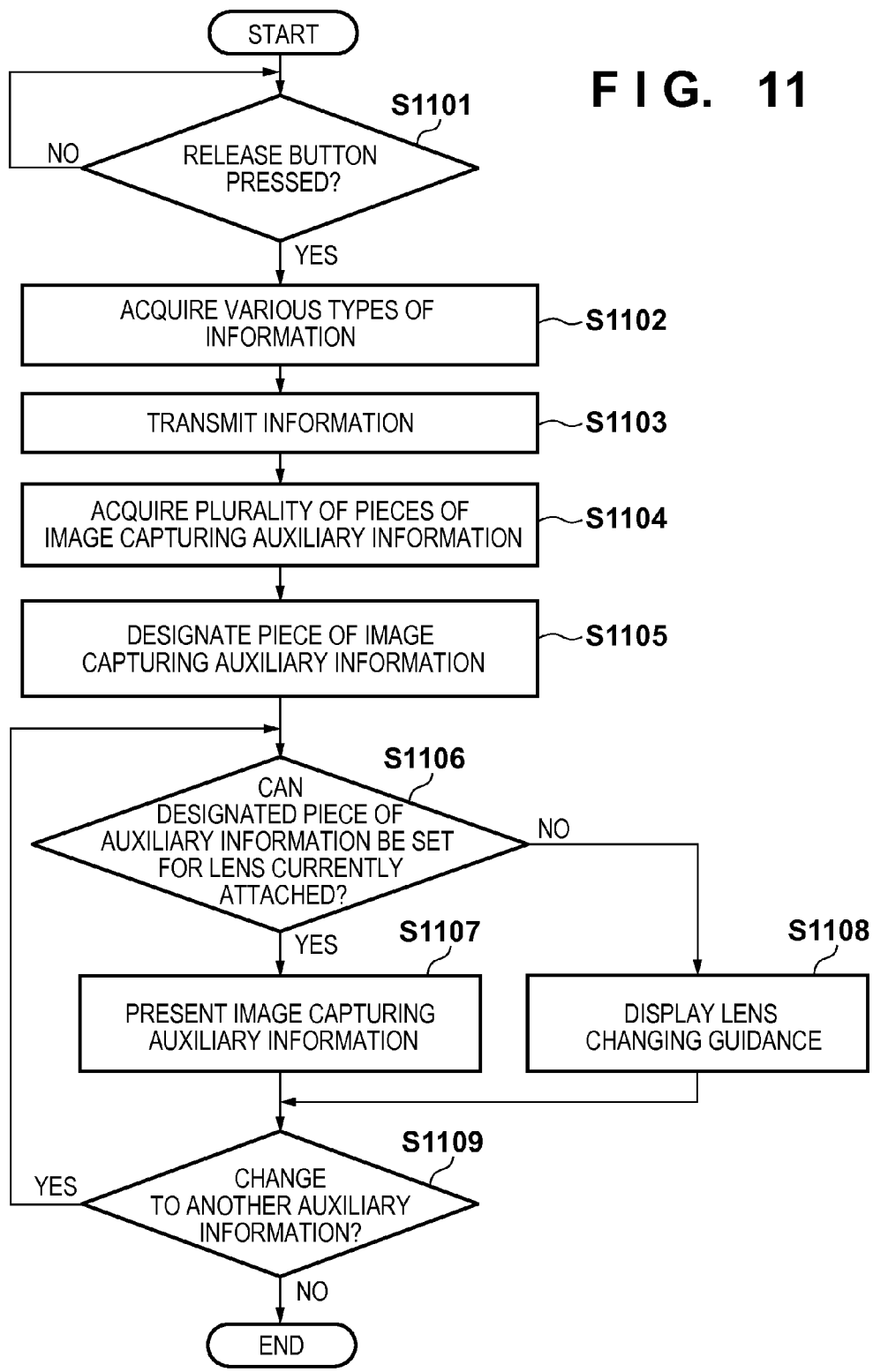
FIG. 11 is a flowchart of processing for acquiring auxiliary information in a third embodiment.
Figure 12:
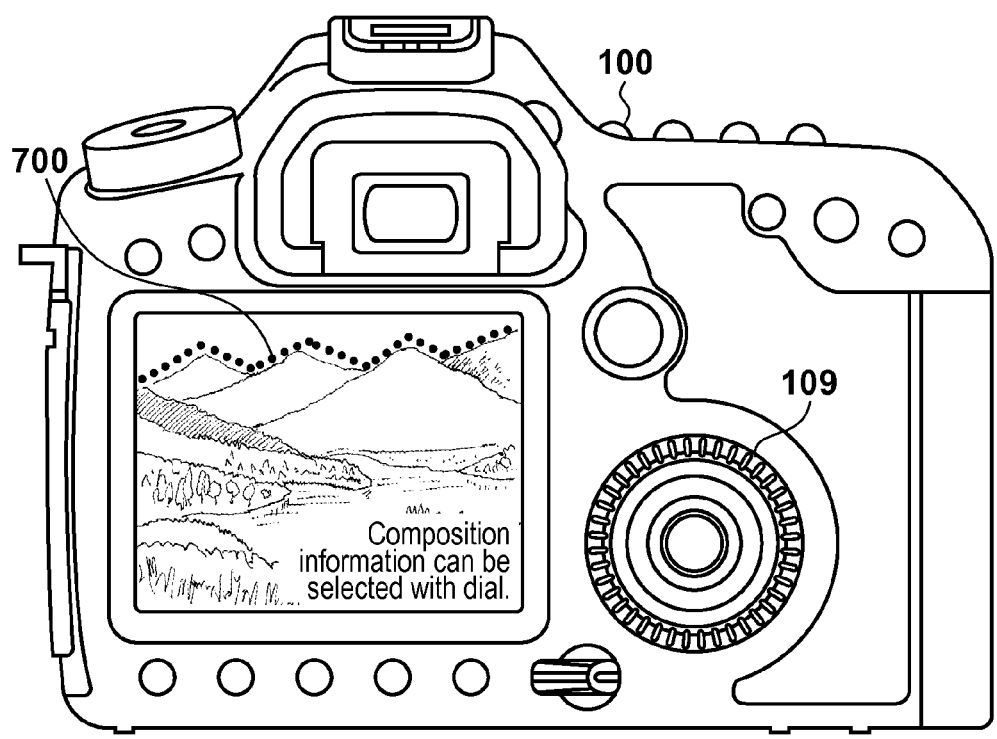
FIG. 12 shows a guidance screen indicating that auxiliary information can be changed.

A description is now given of a third embodiment with reference to FIGS. 11 and 12.

In the above-described embodiments, image capturing auxiliary information corresponding to only one composition is acquired from the information providing apparatus. On the other hand, in the present embodiment, a plurality of pieces of image capturing auxiliary information are acquired from the information providing apparatus.

FIG. 11 shows processing for acquiring image capturing auxiliary information in the third embodiment.

Note that the present embodiment will be described on the precondition that the image capturing apparatus 100 and the information providing apparatus 300 are configured in a manner similar to the above-described embodiments. Also, the processes of S1101 to S1103 in FIG. 11 are similar to the processes of S501 to S503 in FIG. 5, and therefore a description thereof is omitted.

Referring to FIG. 11, in S1104, the CPU 102 receives a plurality of pieces of image capturing auxiliary information from the information providing apparatus 300. These received pieces of information are held in the image capturing apparatus 100. Alternatively, these received pieces of information may be held in any other storage areas such as the non-volatile memory 110 and a RAM (not shown in the figures).

In S1105, the CPU 102 displays the plurality of pieces of image capturing auxiliary information on the display unit 107, and the user designates one of the plurality of pieces of image capturing auxiliary information.

In S1106, through the composition determination unit 113, the CPU 102 determines whether image capturing parameters can be set for the lens that is currently attached based on the image capturing auxiliary information designated by the user, in a manner similar to S505 shown in FIG. 5. When the CPU 102 determines that the image capturing parameters can be set, the CPU 102 displays the image capturing auxiliary information shown in FIG. 9B on the display unit 107 in S1107 so as to present it to the user.

When the CPU 102 determines that the image capturing parameters cannot be set in S1106, the CPU 102 displays the lens changing guidance shown in FIG. 9A on the display unit 107 in S1108 so as to suggest the user to change the lens. Instead of display shown in FIG. 9A and display shown in FIG. 9B, a guidance shown in FIG. 12, which indicates that it is possible to change to another image capturing auxiliary information, may be presented.

Once the user has changed to another image capturing auxiliary information in response to the message in S1109, the processing returns to S1106 in which determination is made as to whether the image capturing parameters can be set based on the post-change image capturing auxiliary information, and the image capturing auxiliary information or the lens changing guidance is presented.

The CPU 102 may display the acquired plurality of pieces of image capturing auxiliary information in the form of a list, such as "scene 1", "scene 2", and so on. In this case, the image capturing auxiliary information acquired based on the accessory that is currently attached and the image capturing auxiliary information acquired based on the history information may be identifiably displayed. Such display may be realized, for example, by displaying scene names in different colors or by displaying scene names with emphasis. Furthermore, the image capturing auxiliary information acquired based on the accessory that is currently attached may be displayed preferentially over the image capturing auxiliary information acquired based on the history information. For example, the image capturing auxiliary information acquired based on the accessory that is currently attached may be displayed in a selected state as default. Alternatively, the image capturing auxiliary information acquired based on the accessory that is currently attached may be displayed higher on the list than the image capturing auxiliary information acquired based on the history information.

According to the present embodiment, a plurality of pieces of image capturing auxiliary information are acquired from the information providing apparatus, the user selects any piece of image capturing auxiliary information that is considered to be suited for the image capturing apparatus from among the plurality of pieces of image capturing auxiliary information, determination is made as to whether image capturing parameters can be set based on the selected piece of image capturing auxiliary information, and the result of the determination is presented. In this way, an image can be captured with the optimal composition selected from among the plurality of pieces of image capturing auxiliary information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-061145, filed Mar. 16, 2012, which is hereby incorporated by reference herein in its entirety.

What is claimed is:

1. An image capturing apparatus comprising:
one or more processors; and
a memory coupled to the one or more processors and having stored thereon instructions which, when executed by the one or more processors, cause the image capturing apparatus to:
capture an object;
acquire image data;
acquire image capturing conditions of the image capturing apparatus;
hold history information of peripheral devices that have been connected to the image capturing apparatus;
acquire, from an external apparatus, image capturing auxiliary information related to image capturing performed by the image capturing apparatus based on the acquired image capturing conditions and on the held history information, wherein the image capturing auxiliary information includes composition data;
output signals for performing image capturing; and
output signals for acquiring the image capturing auxiliary information.

2. The apparatus according to claim 1, wherein the instructions, when executed by the one or more processors, further cause the image capturing apparatus to acquire the image capturing auxiliary information based on the image capturing conditions acquired, on the held history information, and on information of a peripheral device that is currently connected to the image capturing apparatus.

3. The apparatus according to claim 1, further comprising a display unit configured to display the acquired image capturing auxiliary information.

4. The apparatus according to claim 3, wherein when a plurality of pieces of image capturing auxiliary information have been acquired, the display unit identifiably displays image capturing auxiliary information acquired based on a peripheral device that is currently connected and image capturing auxiliary information acquired based on the history information.

5. The apparatus according to claim 3, wherein when a plurality of pieces of image capturing auxiliary information have been acquired, the display unit displays image capturing auxiliary information acquired based on a peripheral device that is currently connected preferentially over image capturing auxiliary information acquired based on the history information.

6. The apparatus according to claim 3, wherein when image capturing auxiliary information based on the history information has been acquired, the display unit displays a guidance that suggests connection of a peripheral device that is not currently connected.

7. The apparatus according to claim 1, wherein the instructions, when executed by the one or more processors, further cause the image capturing apparatus to designate, when a plurality of pieces of image capturing auxiliary information have been acquired, at least one of the plurality of pieces of image capturing auxiliary information.

8. The apparatus according to claim 1, wherein the image capturing auxiliary information is based on a number of times each peripheral device corresponding to the history information has been connected to the image capturing apparatus or on a frequency of connection of each peripheral device corresponding to the history information to the image capturing apparatus.

9. The apparatus according to claim 1, wherein the instructions, when executed by the one or more processors, further cause the image capturing apparatus to register history information or to delete history information.

10. The apparatus according to claim 1, wherein the image capturing conditions include a position or a direction of the image capturing apparatus.

11. The apparatus according to claim 1, wherein the image capturing conditions include date/time information.

12. The apparatus according to claim 1, wherein the image capturing conditions include information indicating whether or not a flash device is connected.

13. The apparatus according to claim 1, wherein the instructions, when executed by the one or more processors, further cause the image capturing apparatus to acquire the image capturing auxiliary information via the Internet.

14. The apparatus according to claim 1, wherein the image capturing auxiliary information includes image capturing parameters.

15. The apparatus according to claim 1, wherein the instructions, when executed by the one or more processors, further cause the image capturing apparatus to transition between a first operation state and a second operation state,
wherein when the image capturing apparatus transitions to the first operation state, the image capturing apparatus performs processing for acquiring the image capturing auxiliary information, and
wherein the image capturing apparatus transitions to the second operation state through the first operation state.

16. A control method of an image capturing apparatus that captures an object and acquires image data, the method comprising:
acquiring image capturing conditions of the image capturing apparatus;
holding history information of peripheral devices that have been connected to the image capturing apparatus;
acquiring, from an external apparatus, image capturing auxiliary information related to image capturing performed by the image capturing apparatus based on the acquired image capturing conditions and on the held history information, wherein the image capturing auxiliary information includes composition data; and
outputting signals for performing image capturing and for acquiring the image capturing auxiliary information.

17. A non-transitory computer-readable storage medium storing a program for causing a computer to execute a control method comprising:
acquiring image capturing conditions of the image capturing apparatus;
holding history information of peripheral devices that have been connected to the image capturing apparatus;
acquiring, from an external apparatus, image capturing auxiliary information related to image capturing performed by the image capturing apparatus based on the acquired image capturing conditions and on the held history information, wherein the image capturing auxiliary information includes composition data; and outputting signals for performing image capturing and for acquiring the image capturing auxiliary information.

* * * * *